No. 822,697. PATENTED JUNE 5, 1906.
W. STANLEY.
DYNAMO ELECTRIC MACHINE.
APPLICATION FILED MAY 25, 1905.

2 SHEETS—SHEET 1.

Witnesses
G. V. Rasmussen

Inventor
WILLIAM STANLEY
By his Attorneys

No. 822,697. PATENTED JUNE 5, 1906.
W. STANLEY.
DYNAMO ELECTRIC MACHINE.
APPLICATION FILED MAY 25, 1905.

2 SHEETS—SHEET 2.

Witnesses

Inventor
WILLIAM STANLEY
By his Attorneys

UNITED STATES PATENT OFFICE.

WILLIAM STANLEY, OF GREAT BARRINGTON, MASSACHUSETTS.

DYNAMO-ELECTRIC MACHINE.

No. 822,697.　　　　Specification of Letters Patent.　　　　Patented June 5, 1906.

Application filed May 25, 1905. Serial No. 262,182.

*To all whom it may concern:*

Be it known that I, WILLIAM STANLEY, a citizen of the United States, residing at Great Barrington, county of Berkshire, State of Massachusetts, have invented certain new and useful Improvements in Dynamo-Electric Machines, of which the following is a full, clear, and exact description.

My invention relates to alternating-current dynamo-electric machines having alternate-current excitation, and particularly to machines of the polar type.

It has for its object to produce an alternating-current dynamo-electric machine of the polar type which is self-excited by alternating currents.

I have discovered that if currents are induced in the rotor-windings of a dynamo-electric machine and conducted to energizing-windings which produce a field which does not coincide with the field of the rotor the machine will be self-excited by alternating currents.

In a prior application filed by me on the 2d day of February, 1905, Serial No. 243,842, I have described such a machine and broadly claimed the inventions embodied therein.

The machine of this application is one which embodies the same fundamental invention in its preferred form, but has dissymmetrically-formed windings as distinguished from symmetrically-formed windings dissymmetrically located. In this type of machine the polar type is the preferred form, and the windings are symmetrically located around the stator structure, but are grouped dissymmetrically with reference to currents flowing from the two phases of the rotor, the result being the production of a dissymmetrical field or one whose center does not correspond with the center of the rotor-field. The resultant flux of the rotor and stator, therefore, as it revolves around the rotor and stator windings induces electromotive forces differing in phase in the rotor and stator circuits.

The machine has the advantage of having a more definite neutral zone upon the commutator and has in addition the advantages of construction accompanying machines of the polar type.

The following is a description of my invention, reference being had to the accompanying drawings, in which—

Figure 1:
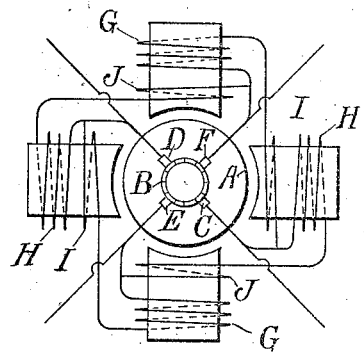
Figure 2:
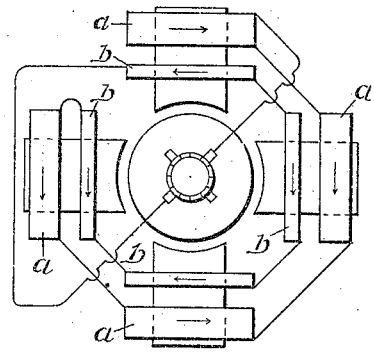
Figure 3:
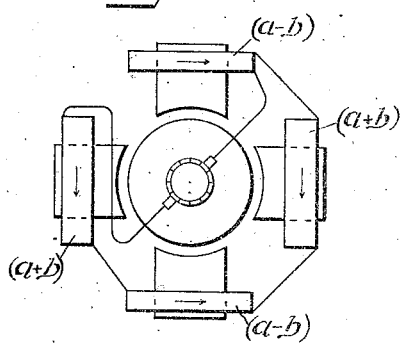
Figure 4:
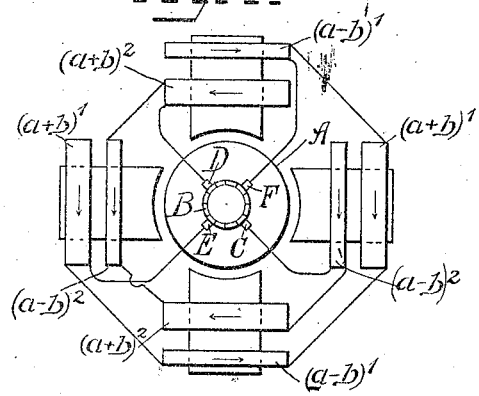
Figure 5:
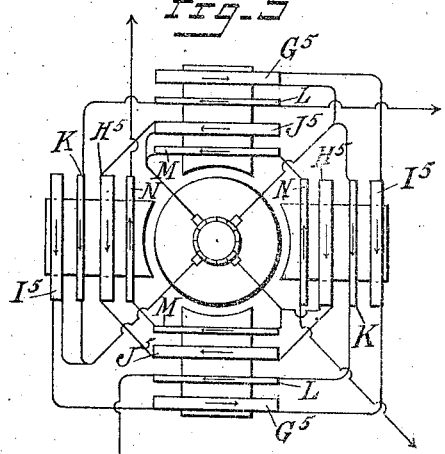
Figure 6:
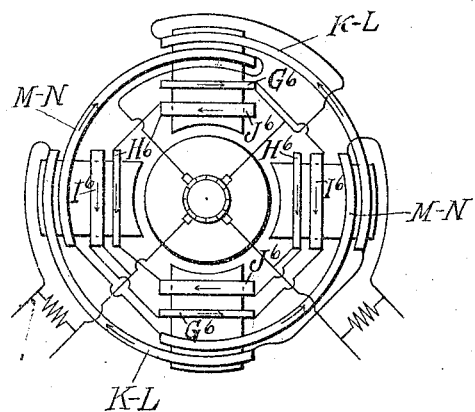
Figure 7:
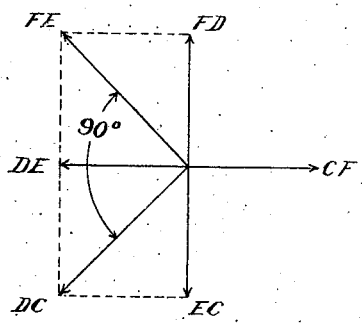
Figure 8:
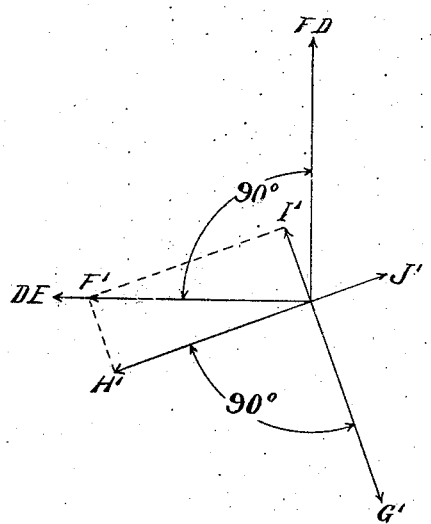

Figure 1 represents one embodiment of my invention. Figs. 2 and 3 show diagrams for explaining a modification of the same. Fig. 4 shows the modification referred to. Fig. 5 shows the modification having compounding or compensating coils added. Fig. 6 shows the modification with compounding or compensating coils of different forms. Fig. 7 is a diagram of generated electromotive forces. Fig. 8 is a vector diagram of electromotive forces and fluxes.

Referring more particularly to the drawings, A is a rotor having preferably a winding of the ordinary distributed type, and a commutator B, having its segments connected to the windings of the rotor A in the ordinary way. C D and E F are brushes bearing on said commutator. G G and H H are main energizing or field coils connected to said brushes C, D, E, and F.

I I J J are deflecting-windings in series with and of fewer turns than the windings G G H H and placed upon the succeeding poles and connected to the succeeding brushes, respectively.

The coils I I and J J have induced in them effective electromotive forces driving the magnetizing-currents through the main field-coils G G and H H. Thus we have coils I I on diametrically opposite poles receiving fluxes from coils H H and having electromotive forces induced in them and in series with the coils G G on poles which in this embodiment are at right angles to the coils I I. The electromotive forces induced in the coils I I by the currents in the coils H H drive the current through the circuits G I and produce a nearly vertical field. The coils J J have induced in them by the fluxes from the coils G G electromotive forces which drive the current through the coils H H and produce a horizontal field.

The currents passing through the coils G G and H H are of different phase resulting in a magnetic field rotating in a clockwise direction, the same as the rotor. The electromotive forces generated in the rotor-windings depend upon the difference between the magnetic and mechanical rotations. The commutator B alters the frequency of the currents delivered at the brushes by commutating out the frequency due to mechanical rotation of the rotor, so that it corresponds to the speed of magnetic rotation without regard to the speed of mechanical rotation. The dynamo is therefore self-exciting and has a frequency depending upon the magnetic rotation.

The production of the rotating field may be explained as follows: The difference of potential between two adjacent brushes—for instance, F and D—gives a current which energizes the coils H and J, and this current produces a flux whose polar line is practically horizontal. Therefore while the flux which has generated the difference of potential between the brushes F and D is a vertical flux the flux produced by this electromotive force (between F and D) is horizontal—that is to say, ninety degrees away from the other flux. The flux due to the electromotive force between the brushes F and D does not, as in the normal self-exciting machine, reinforce the flux which has produced the electromotive force between F and D, but is shifted ahead ninety degrees in position and produces an electromotive force between the brushes D and E. This electromotive force between the brushes D and E produces a flux which gives an electromotive force between the brushes E and C, and so on, the result being that the flux of the machine has not a fixed polar line, but is a revolving field, and in consequence the electromotive forces generated in the machine are of polyphase character.

The diagram of Fig. 7 gives the relative phase relation of the electromotive forces represented by the lines F D, C F, E C, and D E, corresponding to the electromotive forces between the brushes F and D, the brushes C and F, the brushes E and F, and the brushes D and E. It also gives the phase relation between the terminal electromotive forces, the same being in quadrature. These terminal electromotive forces are represented by C D and E F, which correspond, respectively, to the electromotive forces between the brushes C and D and the brushes E and F.

Fig. 8 represents a simple vector diagram showing the action of the fields. F D and D E are electromotive forces existing between the adjacent brushes F and D and the adjacent brushes D and E. The electromotive force F D sends through the coils H J, to which the brushes F and D are connected, a current which lags almost ninety degrees behind the electromotive force F and D. The current flowing through the coil H is represented in the diagram by the vector H', and the current flowing through the coil J is represented in the diagram by the vector J'. J' is opposite in direction to H' because the coil J is reversed in its connection with the coil H. Analogously the electromotive force D and E sends through the coil I a current (represented in the diagram by I') lagging almost ninety degrees behind the electromotive force D E and through the coil G a current (represented by G') opposite to I'. The magnetization of the pole opposite the brushes D E, Fig. 1, is then due to the resultant of H' I'. This resultant flux F' is in phase with the electromotive force D E, and the electromotive force D E is actually produced by the rotation of the armature in this resultant flux F'. The same phenomenon occurs in the other poles of the machine. In other words, each set of adjacent brushes energizes a pole ninety degrees away in position. Owing to the resistance of the windings the current sent by the electromotive force D F, for instance, through the coil H, lags behind D F less than ninety degrees in time. Therefore another coil I is wound on the same pole and is energized by a current flowing from the brushes D and E, the function of this coil I being to bring the flux exactly in quadrature with the electromotive force D F. Then the electromotive force D E will lag exactly ninety degrees behind the electromotive force D F, and the phenomenon being cyclic around the machine the electromotive force D C, Fig. 1, will lag exactly ninety degrees behind the electromotive force E F.

Fig. 4 shows another type of field-coil connection, of which one phase is shown in simplified form in Figs. 2 and 3. In Fig. 2 the coils $a\ a\ a\ a$ are connected in series with the coils $b\ b\ b\ b$. The direction of the currents in the two coils $a$ and $b$ at top and bottom is opposite, while the direction of the currents in the coils $a$ and $b$ on each of the two horizontal poles is the same, as shown by the arrows. Since all the coils $a$ and $b$ are in series, their fluxes are in phase and give the vertical poles a magnetomotive force equal to $a$ minus $b$, $(a-b,)$ as the currents in the coils $a$ and $b$ are opposite, while in the horizontal poles the magnetomotive force is $a$ plus $b$, $(a+b,)$ as the currents are in the same direction. The equivalent of this arrangement is that shown in Fig. 3, where the coils $a$ and $b$ on each pole are compounded into a single coil of $a$ minus $b$ $(a-b)$ or $a$ plus $b$ $(a+b)$ turns, the coils being marked, respectively, $(a-b)$ and $(a+b)$.

Fig. 4 shows the connection of two phases arranged on this plan. The coils of the vertical poles of one phase have $(a-b)$ turns and are marked $(a-b)'$, and the coils of the horizontal poles of the same phase $(a+b)$ turns and are marked $(a+b)'$, while the coils of the vertical poles of the other phases have $(a+b)$ turns and are marked $(a+b)^2$, and the coils of the horizontal poles of that phase have $(a-b)$ turns and are marked $(a-b)^2$.

The dissymmetrical construction of these symmetrically-arranged coils results in a lack of coincidence between the stator-field and the rotor-field. Thus when either circuit has a maximum current, the current of the other circuit being zero, the main energizing-coils exert a maximum magnetizing effect, while the deflecting-coils in series therewith also act to magnetize their poles. On account of the difference in the number of turns in the main energizing-coils and the deflecting-coils in series therewith the polar line is not in the center of figure between any two adjacent polar projections, but is deflected backward against the direction of rotation. The effect of this distortion is to produce an electromotive force tending to urge a current through the magnetizing-coils, this electromotive force being equal to the vector difference between the electromotive forces induced in the rotor and stator windings. The same result may be produced by various other connections and in connection with alternating currents having a greater number of phases.

Fig. 5 shows the machine of Fig. 4 with compounding coils added thereto. In this figure the coils $G^5 G^5$ correspond to the coils $(a-b)'$ of Fig. 4, and the coils $I^5 I^5$ correspond to the coils $(a+b)'$ of Fig. 4. The coils $H^5 H^5$ correspond to the coils $(a-b)^2$, and the coils $J^5 J^5$ correspond to the coils $(a+b)^2$. In addition to these coils two sets of compounding coils K and L are placed upon the poles in series with the work-circuit of one phase, while two sets of compounding coils M and N are placed upon the poles in series with the work-circuit of the other phase. The compounding coils of one circuit are displaced by ninety degrees from the energizing-coils of that circuit, which are wound in the same direction. This is the arrangement when the work-circuit is delivering unity power current, since the magnetizing forces of the compounding coils are thereby made to be in phase with the magnetizing forces of the energizing-coils of the other phase, whose currents lag ninety degrees behind their electromotive forces. The displacement of the compounding coils is equal to the complement of the angle of lag of the current in the work-circuit. This is the general rule and is substantially correct for zero or unity power-factor work-currents and also for work-currents of other power factors.

In Fig. 6 another arrangement is shown, in which the coils $G^6 G^6$ correspond to the coils $(a-b)'$ of Fig. 4, and the coils $I^6 I^6$ correspond to the coils $(a+b)'$ of Fig. 4. The coils $J^6 J^6$ correspond to the coils $(a+b)^2$ and the coils $H^6 H^6$ correspond to the coils $(a-b)^2$. The compounding coils, instead of being separate, as in Fig. 5, are consolidated and each embraces two polar projections. Thus the two compounding coils K L each surround two polar projections adjacent to one diameter, while the two compounding coils M N each embrace the polar projections adjacent to a diameter ninety degrees therefrom. In this case the center of figure of the compounding coils coincides with the center of figure of the energizing-coils belonging to the same circuit and traversed by currents in the opposite direction and is displaced by ninety degrees from the center of figure of the energizing-coils of the other circuit, which are traversed by currents in the opposite direction. This arrangement is the proper one when a negative potential gradient is desired, and when the work-circuits are delivering zero-power-factor currents, the displacement being the complement of the angle of lag in the work-circuits. The magnetizing forces of the compounding coils are in phase with and opposed to the magnetizing forces of the energizing-coils, so that as the load increases the potential falls, or, in other words, the potential gradient is negative.

The compounding coils, as shown, are connected in such a way that the entire current of the work-circuit flows through them, as distinguished from the current from the stator or rotor circuits. It is not, however, necessary to have the entire current flow through the compounding coils. If the compounding coils are displaced from their corresponding main energizing-coils by an angle equal to the complement of the angle of lag of the current in the work-circuits, they will act to modify the entire magnetizing flux of one phase of the machine. With the coils wound as indicated the magnetomotive force of the main energizing-windings and the compounding coils always assist one another instead of opposing one another. The compounding coils, therefore, tend to increase the magnetization of the machine as the work-currents increase. If the compounding coils were wound so as to oppose the magnetization of the main energizing-coils, the effect of the increase of current in the work-circuit would obviously be to decrease the magnetization of the machine.

In the arrangement shown in Figs. 5 and 6 the action of the compounding coils is to increase the flux of one phase by unity-power-factor currents in the other. Such increase of flux tends to increase the electromotive force effective in driving the magnetizing-current from the brush to which the compounding coil is connected. In other words, to increase the electromotive force magnetizing the machine, and consequently to increase its potential. It, however, has but little influence in increasing the flux and electromotive force of the machine when a power-factor zero or lagging current is flowing through the compounding coils, for the reason that then the flux produced is at right angles to the flux of the machine and does not directly assist it.

The compounding coils may be said to act by producing magnetism in the machine which generates such an electromotive force as to increase the magnetization.

Various windings and connections may be used in carrying out my invention in connection with the polar type, as will be obvious to those skilled in the art.

While I do not desire to be understood as limiting my broad invention to any one of the particular forms shown and described, what I claim is—

1. In a dynamo-electric machine, the combination of a rotor and a stator, one of said members having windings thereon, a commutator connected thereto, brushes bearing on said commutator, and the other of said members having polar projections, multiphase windings thereon connected to said brushes and producing a field dissymmetrical relatively to the field produced by the other of said windings.

2. In a dynamo-electric machine the combination of a rotor, windings thereon, a commutator connected thereto, brushes bearing thereon, a stator having polar projections, multiphase windings on said stator, connected to said brushes and producing a field dissymmetrical relatively to the field produced by the windings on the rotor.

3. In a dynamo-electric machine, the combination of a stator-winding, a rotor-winding electrically connected thereto, said stator-winding being dissymmetrical in form so that the center of flux produced by each phase of current does not coincide with the center of figure of the stator-coils producing it.

4. In a dynamo-electric machine, the combination of a stator-winding, a rotor-winding electrically connected thereto, polar projections for said stator-windings, said rotor-winding being symmetrical in form and said stator-winding being dissymmetrical in form so that the center of flux produced by said stator-winding does not coincide with the center of flux produced by said rotor-winding.

5. In a dynamo-electric machine, the combination of the stator-winding and rotor-winding, a commutator connected to said rotor-winding, brushes bearing upon said commutator and connected to said stator-winding, said stator-winding being of such dissymmetrical form as to have its electromotive force displaced in phase from the electromotive force of the rotor-winding to which it is connected.

6. In a dynamo-electric machine, the combination of the stator-winding and the rotor-winding, a commutator connected to said rotor-winding, brushes bearing upon said commutator and connected to said stator-winding, said stator-winding being dissymmetrical in form so that the center of its magnetic field does not coincide with the center of its figure.

7. In a dynamo-electric machine, the combination of a rotor, windings thereon, a commutator connected thereto, brushes bearing thereon, a stator having polar projections, multiphase windings on said stator connected to said brushes and producing a field dissymmetrical relatively to the field produced by the windings on the rotor, and compounding coils traversed by work-circuit currents and so disposed relatively to the energizing-coils as to superimpose a rotating magnetic field varying with the load.

8. In a dynamo-electric machine, the combination of a rotor, windings thereon, a commutator connected thereto, brushes bearing thereon, a stator having polar projections, multiphase windings on said stator connected to said brushes and producing a field dissymmetrical relatively to the field produced by the windings on the rotor, and compounding coils traversed by the work-circuit currents and so disposed relatively to the energizing-coils as to superimpose a rotating magnetic field varying with the load, the compounding coils being in series with said work-circuit and displaced from said energizing-coils by approximately the complement of lag of the currents in said work-circuits.

WILLIAM STANLEY.

Witnesses:
A. B. BROWNELL,
L. VREELAND.

---

It is hereby certified that in Letters Patent No. 822,697, granted June 5, 1906, upon the application of William Stanley, of Great Barrington, Massachusetts, for an improvement in "Dynamo-Electric Machines," an error appears in the printed specification requiring correction, as follows: In line 116, page 2, the word "phases" should read *phase;* and that the said Letters Patent should be read with this correction therein that the same may conform to the record of the case in the Patent Office.

Signed and sealed this 19th day of June, A. D., 1906.

[SEAL.]

F. I. ALLEN,
*Commissioner of Patents.*